United States Patent
Cho et al.

(10) Patent No.: US 9,610,540 B2
(45) Date of Patent: Apr. 4, 2017

(54) EXHAUST GAS TREATMENT APPARATUS

(71) Applicant: GEESCO CO., LTD., Gyeonggi-do (KR)

(72) Inventors: Buk-Ryong Cho, Seoul (KR); Dae-Woo Kim, Incheon (KR); Ha-Kue Park, Daejeon (KR)

(73) Assignee: GEESCO CO., LTD. (KR)

( * ) Notice: Subject to any disclaimer, the term of this patent is extended or adjusted under 35 U.S.C. 154(b) by 164 days.

(21) Appl. No.: 14/415,096

(22) PCT Filed: Aug. 23, 2013

(86) PCT No.: PCT/KR2013/007590
§ 371 (c)(1),
(2) Date: Jan. 15, 2015

(87) PCT Pub. No.: WO2014/030971
PCT Pub. Date: Feb. 27, 2014

(65) Prior Publication Data
US 2015/0202571 A1   Jul. 23, 2015

(30) Foreign Application Priority Data

Aug. 24, 2012   (KR) ..................... 10-2012-0092887

(51) Int. Cl.
*B01D 53/94* (2006.01)
*F23J 13/00* (2006.01)
(Continued)

(52) U.S. Cl.
CPC ....... *B01D 53/9431* (2013.01); *F01N 3/0205* (2013.01); *F01N 3/0814* (2013.01);
(Continued)

(58) Field of Classification Search
CPC ....... B01D 53/9431; F23J 13/00; F23L 11/00; F01N 3/0205; F01N 3/0814
See application file for complete search history.

(56) References Cited

U.S. PATENT DOCUMENTS

| | | | | | |
|---|---|---|---|---|---|
| 4,354,528 | A | * | 10/1982 | McAndrew | B01D 46/02 137/875 |
| 5,423,272 | A | * | 6/1995 | Dunn, Jr. | F23J 15/02 110/264 |

FOREIGN PATENT DOCUMENTS

| JP | 3312858 B2 | 5/2002 |
|---|---|---|
| JP | 2012-041840 A | 3/2012 |

(Continued)

OTHER PUBLICATIONS

Machine translation of JP 2012-041840 (Mar. 1, 2012).*
(Continued)

*Primary Examiner* — Sally Merkling
(74) *Attorney, Agent, or Firm* — Volpe and Koenig, P.C.

(57) ABSTRACT

There is provided an exhaust gas treatment apparatus. The exhaust gas treatment apparatus includes: a main discharge passage through which exhaust gas of combustion equipment is discharged; an heat exchanger between the combustion equipment and the main discharge passage; a nitrogen oxide decreasing device connected to the main discharge passage to decrease nitrogen oxides of exhaust gas; a bypass connected from the combustion equipment to the main discharge passage as a passage bypassing the heat exchanger to supply high temperature exhaust gas from the combustion equipment to the nitrogen oxide decreasing device; and a variable exhaust regulator disposed between the bypass and the main discharge passage to vary the amount of relatively high temperature exhaust gas flowing in the bypass and the amount of exhaust gas flowing in the main discharge passage in a correlated manner.

7 Claims, 10 Drawing Sheets

(51) Int. Cl.
   *F23L 11/00*   (2006.01)
   *F23J 15/04*   (2006.01)
   *F01N 3/02*    (2006.01)
   *F01N 3/08*    (2006.01)

(52) U.S. Cl.
   CPC ............... *F23J 13/00* (2013.01); *F23J 15/04* (2013.01); *F23L 11/00* (2013.01); *F23J 2215/10* (2013.01); *F23J 2219/40* (2013.01)

(56) References Cited

FOREIGN PATENT DOCUMENTS

| | | |
|---|---|---|
| KR | 10-0405437 B1 | 11/2003 |
| KR | 10-057089 A | 4/2006 |
| KR | 10-0917667 B1 | 9/2009 |
| KR | 10-0949432 B1 | 3/2010 |

OTHER PUBLICATIONS

Written Opinion and International Search Report mailed in corresponding International Patent Application No. PCT/KR2013/007590 on Nov. 21, 2013, consisting of 6 pp. (English Translation Provided).

\* cited by examiner

Fig. 2
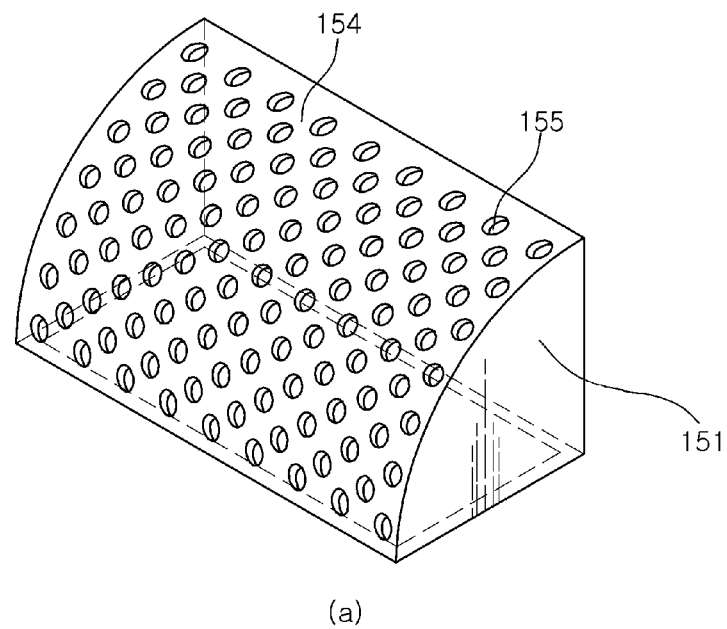
(a)
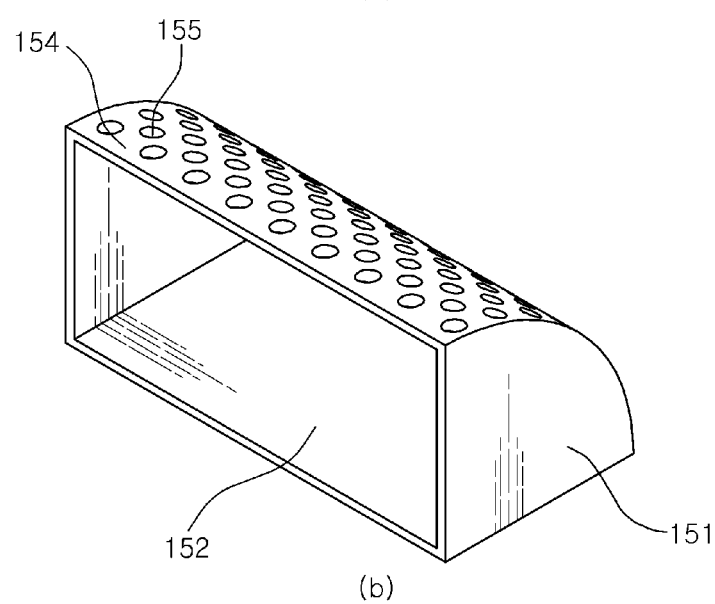
(b)

Fig. 4
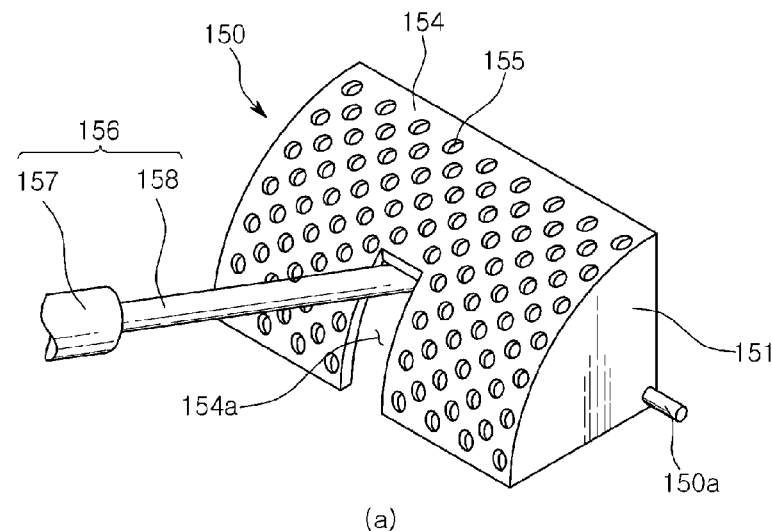
(a)
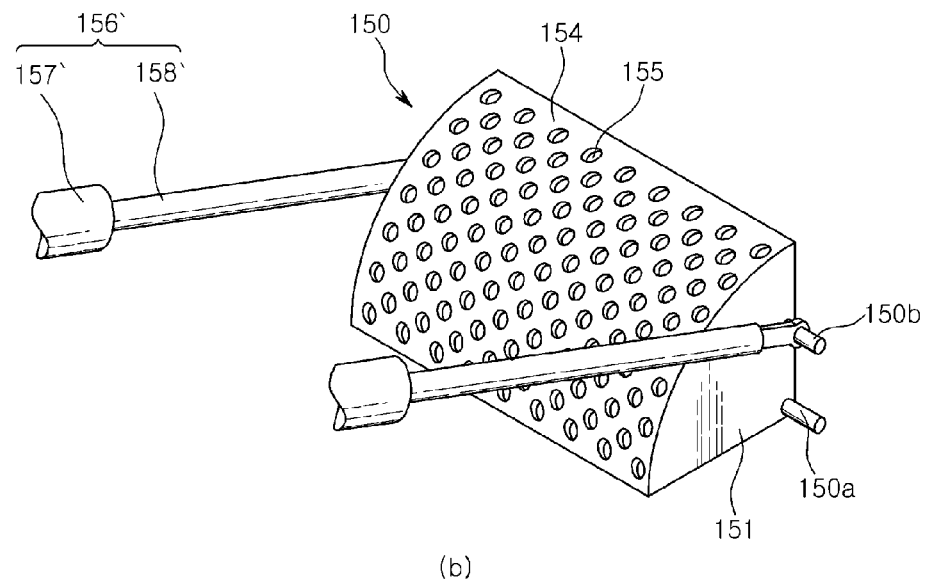
(b)
Fig. 5
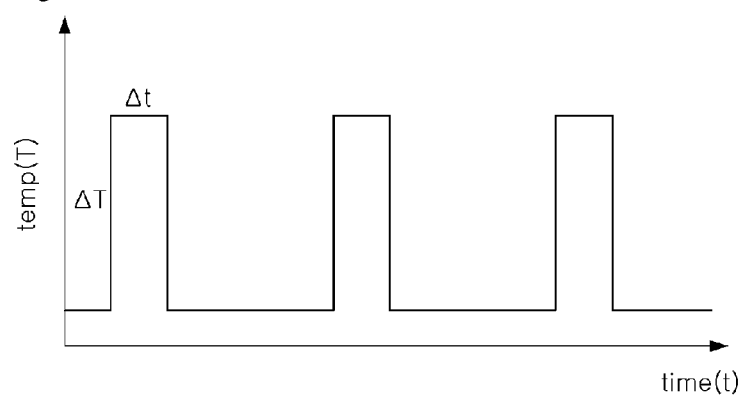

EXHAUST GAS TREATMENT APPARATUS

TECHNICAL FIELD

The present invention relates to an exhaust gas treatment apparatus for reducing pollutants contained within exhaust gas generated during combustion, and more particularly, to an exhaust gas treatment apparatus for reducing pollutant emission by increasing the temperature of exhaust gas to the active or regeneration temperature range of a catalytic device.

BACKGROUND ART

In general, types of combustion equipment such as boilers using coal, oil, gas, or other combustible materials, generate exhaust gasses during combustion. Pollutants such as nitrogen oxides (NOx) may be contained in exhaust gas generated by such equipment, and thus it is necessary to develop techniques for protecting the atmosphere from pollutants such as nitrogen oxides (NOx).

Such nitrogen oxides can be reduced by controlling combustion (a pretreatment method) or treating exhaust gas (a post-treatment method).

Most post-treatment methods employ a selective catalyst reduction (SCR) device as a nitrogen oxide decreasing device. For example, in a nitrogen oxide removal method using an SCR device, exhaust gas is mixed with a reducing agent such as ammonia, and the mixture is passed through a catalyst, so as to convert nitrogen oxides (NOx) included in the exhaust gas into nitrogen ($N_2$) and water ($H_2O$) through chemical reactions expressed by Chemical Formulas 1 and 2 below.

ChemistryFigure 1

$$4NO + 4NH_3 + O_2 \rightarrow 4N_2 + 6H_2O \quad \text{[Chem.1]}$$

ChemistryFigure 2

$$2NO_2 + 4NH_3 + O_2 \rightarrow 3N_2 + 6H_2O \quad \text{[Chem.2]}$$

Catalysts have active temperature ranges in which the catalysts are effective for catalysis. For this reason, it may be necessary to increase the temperature of exhaust gas to be within a catalyst active temperature range of 310° C. to 420° C.

In some cases, however, the actual operating temperatures of coal-burning boilers are lower than designed temperatures thereof due to the low caloric power of recently-produced coal. Particularly, when operating a boiler in a low-load condition, it may be difficult to maintain the catalyst active temperature range therein. If a catalyst is used for a certain period of time at a temperature lower that the minimum active temperature thereof, the activity and selectivity of the catalyst may be markedly reduced due to ammonium sulfate (known as a poisoning phenomenon).

For example, sulfur dioxide ($SO_2$) and sulfur trioxide ($SO_3$) are generated during the combustion of coal or oil (heavy oil) in a boiler, and sulfur trioxide ($SO_3$) may react with moisture contained in exhaust gas and some ammonia ($NH_3$) sprayed from the front side of a nitrogen oxide decreasing device such as an SCR device, to form ammonium sulfate ($NH_4HSO_4$, $(NH_4)_2SO_4$) as expressed by Chemical Formulas 3 and 4 below.

ChemistryFigure 3

$$4NH_3 + SO_3 + H_2O \rightarrow NH_4HSO_4 \quad \text{[Chem.3]}$$

ChemistryFigure 4

$$2NH_3 + SO_3 + H_2O \rightarrow (NH_4)_2SO_4 \quad \text{[Chem.4]}$$

Ammonium sulfate may be coated on the surface of a catalyst to decrease the activeness of the catalyst and corrode the rear side of the nitrogen oxide decreasing device or other devices. In addition, ammonium sulfate may clog exhaust gas passages of the SCR device and a heat exchanger such as an air preheater to increase pressure loss within a boiler. This phenomenon may be increased in severity as the temperature of exhaust gas of the boiler decreases.

Therefore, many catalyst manufacturers recommend that the minimum temperature of exhaust gas of a boiler should be 310° C. or higher in the case of using high-sulfur coal or oil (heavy oil) as fuel so as to prevent a poisoning phenomenon.

If a catalyst is poisoned (that is, a poisoning phenomenon occurs), the catalyst is removed from a nitrogen oxide decreasing device and is chemically treated to remove substances causing the poisoning phenomenon. If the catalyst cannot be regenerated by such a method, the catalyst is discarded.

However, such a catalyst regeneration method requires relatively expensive chemicals, and it may require a significant amount of money to treat waste water. Furthermore, since a boiler can't be operated while a catalyst is regenerated, a great deal of loss may be caused.

For this reason, a great deal of research has been conducted into techniques for regenerating a poisoned catalyst during boiler operations without the necessity of removing a catalyst from a nitrogen oxide decreasing device. For example, Korean Patent No.: 10-917667 discloses a method of increasing the temperature of exhaust gas to regenerate a catalyst used in an incinerator.

However, the method disclosed is for powder catalysts and thus is not suitable for catalysts having a honeycomb, a flat plate, or a wave shapes that are most commonly used in nitrogen oxide decreasing devices (such as SCR devices) of boilers. Furthermore, in the related art, during boiler operations, ammonia has to be continuously supplied to an SCR device, and there is a limit on increasing the temperature of the SCR to 300° C. or higher. Therefore, the efficiency of catalyst regeneration may be low.

Korean Patent No.: 10-949432 discloses a technique of supplying high temperature exhaust gas to an SCR device through a bypass connected from a side of a boiler to the SCR device for regenerating a catalyst of the SCR device during boiler operations.

However, the technique disclosed for regenerating a catalyst using high temperature exhaust gas supplied through a bypass may cause non-uniform temperature distribution in the SCR device, and the temperature of the SCR device may not be maintained within a proper temperature range if exhaust gas flows backwards in the bypass or if a sufficient amount of exhaust gas is not supplied through the bypass. In the related art, a gas distributor is used to uniformly distribute high temperature exhaust gas for preventing non-uniform temperature distribution. However, such a gas distributor may increase the interior pressure of a boiler to lower the thermal efficiency thereof, and the gas distributor may be damaged by constant exposure to high temperature exhaust gas.

DISCLOSURE OF INVENTION

Technical Problem

An aspect of the present invention provides an exhaust gas treatment apparatus having an improved structure. In the exhaust gas treatment apparatus, high temperature exhaust gas supplied through a bypass can be uniformly mixed with exhaust gas flowing in a main discharge passage. The interior temperature of the exhaust gas treatment apparatus can appropriately maintained, and an increase in internal pressure can be prevented for high-efficiency operations. Thermal damage caused by high temperature exhaust gas can be reduced for increasing the durability of the exhaust gas treatment apparatus.

Solution to Problem

According to an aspect of the present invention, there is provided an exhaust gas treatment apparatus including: a main discharge passage through which exhaust gas generated by combustion equipment is discharged; an heat exchanger disposed between the combustion equipment and the main discharge passage; a nitrogen oxide decreasing device connected to the main discharge passage so as to decrease nitrogen oxides included in exhaust gas; a bypass connected from the combustion equipment to the main discharge passage as a passage bypassing the heat exchanger so as to supply high temperature exhaust gas generated by the combustion equipment to the nitrogen oxide decreasing device through a passage bypassing the heat exchanger; and a variable exhaust regulator disposed between the bypass and the main discharge passage so as to vary an amount of relatively high temperature exhaust gas flowing through the bypass and an amount of relatively low temperature exhaust gas flowing through the main discharge passage in a correlated manner, wherein the variable exhaust regulator is insertable into the bypass and includes: a blocking part used to adjust a degree of opening or closing of the bypass or the main discharge passage; a driving unit configured to swing or move the blocking part; and a control unit configured to control the driving unit so as to adjust a degree of opening or closing of the blocking part according to a temperature of exhaust gas flowing in the main discharge passage and a temperature of exhaust gas flowing in the bypass.

The variable exhaust regulator may further include a spraying part between an end of the blocking part and the bypass, and at least one discharge hole may be formed in the spraying part to adjust a spraying direction of high temperature exhaust gas.

The blocking part may be rotatable at an end thereof, and the driving unit may include an actuator connected to a side of the blocking part and extendable to push or rotate the blocking part.

The blocking part may be rotatable at an end thereof, and the driving unit may include a motor configured to rotate the blocking part through at least a connection member.

The exhaust gas treatment apparatus may further include one or more additional variable exhaust regulators, wherein the variable exhaust regulators may be individually operated and correlated so as to control discharging of exhaust gas.

The nitrogen oxide decreasing device may include a selective catalyst reduction (SCR) device configured to remove nitrogen oxides from exhaust gas by brining the exhaust gas into contact with a catalyst.

A temperature of exhaust gas in the SCR may be maintained within a range of 300° C. to 420° C. by the variable exhaust regulator.

If a poisoning phenomenon occurs in the SCR, temperature of exhaust gas in the SCR may be maintained within a range of 350° C. to 420° C. by the variable exhaust regulator.

Advantageous Effects of Invention

As set forth above, according to embodiments of the invention, high temperature exhaust gas can be supplied to a nitrogen oxide decreasing device through a passage bypassing a heat exchanger, so as to increase the temperature of exhaust gas making contact with a denitrification catalyst to the active temperature range of the denitrification catalyst. Therefore, the efficiency of the denitrification catalyst can be improved, and the emission of nitrogen oxides can be reduced.

In addition, according to the embodiments of the invention, high temperature exhaust gas supplied through a bypass can be mixed rapidly and uniformly with relatively low temperature exhaust gas flowing in a main discharge passage to maintain the temperature of exhaust gas to be uniform in the nitrogen oxide decreasing device and thus to uniformly expose the denitrification catalyst to exhaust gas. Therefore, nitrogen oxides can be uniformly decomposed over the entire region of the denitrification catalyst for increasing the efficiency and lifespan of the denitrification catalyst.

According to the embodiments, in addition to decreasing the emission of nitrogen oxides, the denitrification catalyst can be regenerated even in the case that the denitrification catalyst is poisoned. That is, the denitrification catalyst can easily be maintained and used for a long period of time with constant catalysis efficiency.

In addition, according to the embodiments, a variable exhaust regulator can have a simple structure, and thus parts such as dampers necessary for controlling flows of exhaust gas in the bypass or the main discharge passage can also have simple structures. Therefore, the exhaust gas treatment apparatus can easily be manufactured, installed, and maintained. Furthermore, the exhaust gas treatment apparatus can be operated with less pressure loss.

In addition, according to the embodiments, the direction and amount of exhaust gas passing through the variable exhaust regulator can be adjusted so as to rapidly make the exhaust gas uniform and control the temperature and temperature distribution of the exhaust gas at the nitrogen oxide decreasing device.

In addition, according to the embodiments, it takes less time to make exhaust gas uniform before the exhaust gas is supplied to the nitrogen oxide decreasing device. That is, an exhaust gas discharge passage can be shortened.

BRIEF DESCRIPTION OF DRAWINGS

The above and other aspects, features and other advantages of the present invention will be more clearly understood from the following detailed description taken in conjunction with the accompanying drawings, in which:

FIG. 2 is a partial perspective view illustrating a variable exhaust regulator of the exhaust gas treatment apparatus according to the embodiment of the invention;

FIG. 4 is a perspective view illustrating exemplary connection structures of the variable exhaust regulator of the exhaust gas treatment apparatus according to embodiments of the invention;

FIG. 5 is a graph for explaining an exemplary method of operating the exhaust gas treatment apparatus according to an embodiment of the invention;

BEST MODE FOR CARRYING OUT THE INVENTION

Figure 1:
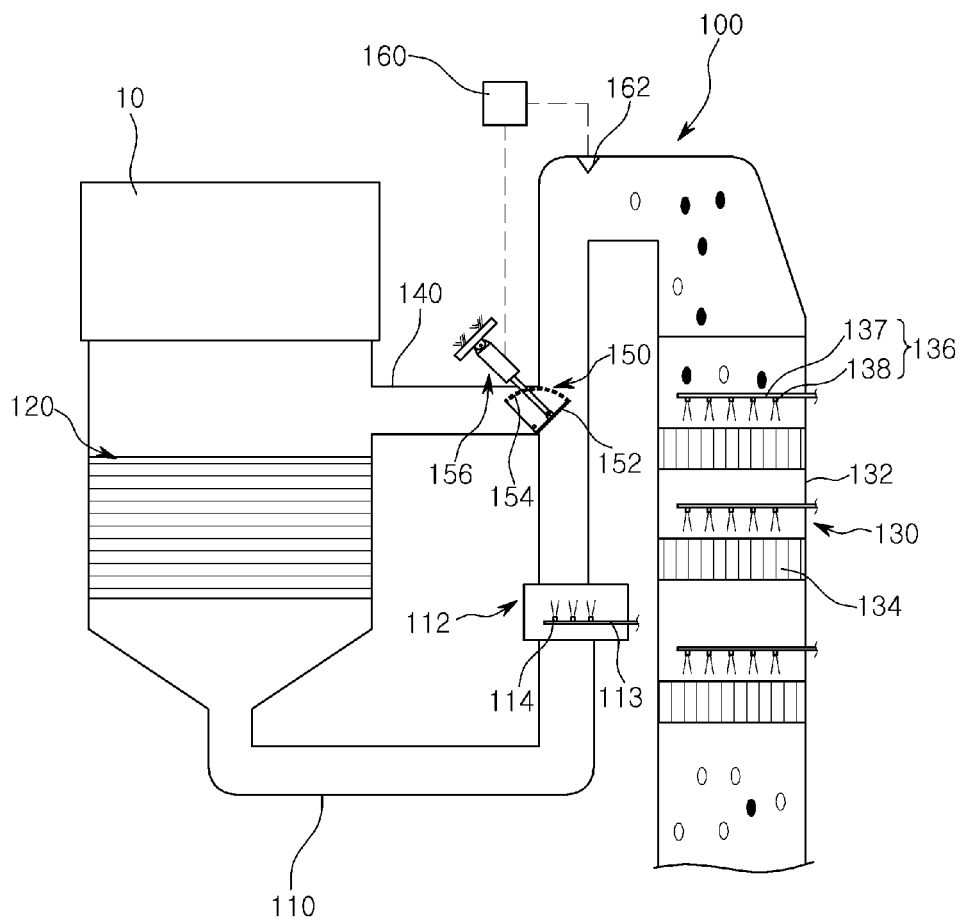
FIG. 1 is a schematic view illustrating an exhaust gas treatment apparatus according to an embodiment of the invention.

Exemplary embodiments of the present invention will now be described in detail with reference to the accompanying drawings. The present invention may, however, be embodied in many different forms and should not be construed as being limited to the embodiments set forth herein. In the drawings, the sizes and shapes of elements may be exaggerated for clarity, and like reference numerals denote like elements.

Figure 3:
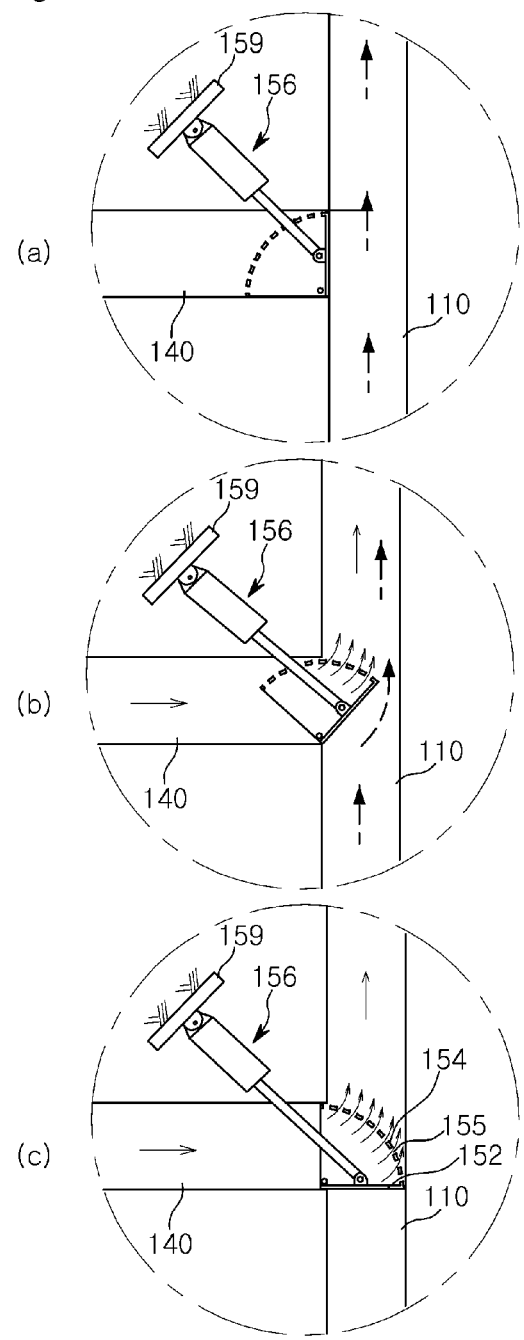
FIG. 3 is a view for explaining how the variable exhaust regulator is operated in the exhaust gas treatment apparatus according to the embodiment of the invention.

FIG. 1 is a schematic view illustrating an exhaust gas treatment apparatus 100 according to an embodiment of the invention, and FIG. 2 is a partial perspective view illustrating a variable exhaust regulator 150 of the exhaust gas treatment apparatus 100 according to the embodiment of the invention. FIG. 3 is a view for explaining how the variable exhaust regulator 150 is operated in the exhaust gas treatment apparatus 100 according to the embodiment of the invention.

Referring to FIGS. 1 to 3, according to the embodiment of the invention, the exhaust gas treatment apparatus 100 may be connected to combustion equipment 10 to treat and discharge exhaust gas generated by the combustion equipment 10.

The exhaust gas treatment apparatus 100 may be used to reduce pollutants such as nitrogen oxides (NOx) and recover heat from high temperature exhaust gas to improve thermal efficiency.

In the embodiment of the invention, the exhaust gas treatment apparatus 100 may include a main discharge passage 110 connected to the combustion equipment 10. The main discharge passage 110 may be used as a passage for discharging exhaust gas generated by the combustion equipment 10.

The combustion equipment 10 may generate high temperature exhaust gas. The exhaust gas treatment apparatus 100 may include a heat exchanger 120 between the combustion equipment 10 and the main discharge passage 110 so as to recover heat from high temperature exhaust gas.

In the embodiment of the invention, the combustion equipment 10 may include a boiler, and the heat exchanger 120 may be an economizer configured to heat water using high temperature exhaust gas.

High temperature exhaust gas generated by the combustion equipment 10 may be cooled through heat exchange with the heat exchanger 120.

For example, exhaust gas as hot as about 400° C. to about 650° C. may be generated by the combustion equipment 10. If such high temperature exhaust gas is directly discharged to the atmosphere, a high degree of thermal efficiency may not be attained, and environmental problems may occur.

Therefore, high temperature exhaust gas generated by the combustion equipment 10 is directed to the heat exchanger (economizer) 120 so that the exhaust gas can be discharged after heating water. In this way, thermal energy can be recovered from high temperature exhaust gas. Water heated in the heat exchanger 120 may be used for heating water that will be supplied to the boiler.

In the embodiment of the invention, the temperature of exhaust gas may be maintained within the range of about 310° C. to about 420° C. after the exhaust gas passes through the heat exchanger (economizer) 120.

A nitrogen oxide decreasing device 130 may be provided in the main discharge passage 110 so as to remove nitrogen oxides from exhaust gas after the exhaust gas passes through the heat exchanger 120.

Nitrogen oxides (NOx) may be generated when nitrogen ($N_2$) included in air is burned at a high temperature. Nitrogen oxides discharged to the atmosphere may cause acid rain, respiratory diseases, depletion of the ozone layer. Thus, the emission of nitrogen oxides is regulated by law to be lower than a certain level of concentration.

Therefore, a device such as the nitrogen oxide decreasing device 130 may be installed on NOx-generating equipment to discharge exhaust gas after removing or decreasing nitrogen oxides.

In the embodiment of the invention, the nitrogen oxide decreasing device 130 may be a selective catalyst reduction (SCR) device configured to remove or decrease nitrogen oxides included in exhaust gas by bringing the exhaust gas into contact with a catalyst.

A reducing agent sprayer 112 may be disposed in the main discharge passage 110 to supply a reducing agent to exhaust gas flowing toward the nitrogen oxide decreasing device 130 so that the exhaust gas and the reducing agent can react with each other while making contact with a catalyst contained in the nitrogen oxide decreasing device 130. The reducing agent sprayer 112 may spray ammonia as a reducing agent so that the ammonia can reduce (deoxidize) nitrogen oxides included in exhaust gas. For this, the reducing agent sprayer 112 may include a tube member 113 and a plurality of nozzles 114 arranged on the tube member 113.

The nitrogen oxide decreasing device 130 may include: a chamber 132; a denitrification catalyst 134 disposed in the chamber 132 in the form of a honeycomb, a flat plate, or a wave shape; and a soot blower 136 disposed on the upstream side of the denitrification catalyst 134.

The soot blower 136 is provided to remove contaminants such as soot or ash from the denitrification catalyst 134. The soot blower 136 may include a tube member 137 and a plurality of nozzles 138 arranged on the tube member 137, so as to blow a medium for removing contaminants.

For example, the soot blower 136 may spray steam, compressed air, or water. In addition, the soot blower 136 may use ultrasonic waves to remove contaminants more efficiently.

In the embodiment of the invention, while exhaust gas generated by the combustion equipment 10 passes through the nitrogen oxide decreasing device 130, nitrogen oxides included in the exhaust gas may react with a reducing agent in the presence of the denitrification catalyst 134. As a result, the nitrogen oxides may be converted into nitrogen ($N_2$) and water ($H_2O$).

At this time, the active temperature range of the nitrogen oxide decreasing device 130 within which nitrogen oxides of exhaust gas can be effectively decomposed may be varied according to the type of the denitrification catalyst 134. For example, the temperature of exhaust gas may be maintained within the range of about 310° C. to about 420° C. to effectively decompose nitrogen oxides.

To this end, the exhaust gas treatment apparatus 100 is configured so that exhaust gas can be supplied to the nitrogen oxide decreasing device 130 within the temperature range of about 310° C. to about 420° C. If the temperature of exhaust gas is higher than about 420° C., the denitrification catalyst 134 may be damaged. If the temperature of exhaust gas is lower than about 310° C., the activity and selectivity of the denitrification catalyst 134 may be markedly decreased due to ammonium sulfate. That is, the denitrification catalyst 134 may be poisoned (known as a poisoning phenomenon).

Therefore, the temperature of exhaust gas may be maintained at a temperature higher than the minimum active temperature of the denitrification catalyst 134 for preventing a poisoning phenomenon. However, factors, such as using recently-produced low-quality coal having a low degree of caloric power, equipment aging, and low-load boiler operations, may increase the possibility that the temperature of exhaust gas is lower than the minimum active temperature of the denitrification catalyst 134.

Therefore, in the embodiment of the invention, the exhaust gas treatment apparatus 100 may include a bypass 140 so that exhaust gas generated by the combustion equipment 10 can directly be supplied to the nitrogen oxide decreasing device 130 without passing through the heat exchanger 120 if the temperature of exhaust gas in the main discharge passage 110 is measured to be lower that the minimum active temperature of the denitrification catalyst 134.

The bypass 140 may be connected between the combustion equipment 10 and the main discharge passage 110 so that high temperature exhaust gas generated by the combustion equipment 10 can flow directly to the main discharge passage 110 without passing through the heat exchanger 120. That is, the temperature of exhaust gas in the nitrogen oxide decreasing device 130 can be increased.

In the embodiment of the invention, the exhaust gas treatment apparatus 100 may include the variable exhaust regulator 150, and the variable exhaust regulator 150 may be disposed between the bypass 140 and the main discharge passage 110 to control the flow rates of exhaust gas flowing in the bypass 140 and the main discharge passage 110.

The variable exhaust regulator 150 may include a blocking part 152 and a driving unit 156. The blocking part 152 may be sized to be insertable into the bypass 140 so that the degree of opening or closing of the bypass 140 or the main discharge passage 110 can be adjusted using the blocking part 152. The driving unit 156 may be used to swing the blocking part 152 to adjust the degree of opening of the bypass 140 or the main discharge passage 110.

In the embodiment of the invention, the driving unit 156 may include an expandable actuator, and the actuator may be attached to a side of the bypass 140 or a bracket 159. The bracket 159 may be attached to a wall of a factory.

In the embodiment of the invention, the driving unit 156 may be controlled by a control unit 160.

The control unit 160 may control the temperature of exhaust gas in the nitrogen oxide decreasing device 130 by adjusting the degree of opening/closing of the blocking part 152 according to the temperatures of exhaust gas flowing in the main discharge passage 110 and the bypass 140.

In the embodiment of the invention, the control unit 160 may control the driving unit 156 according to an operation signal input by an operator or automatically.

For this, a sensor 162 may be disposed on a front side of the nitrogen oxide decreasing device 130 to measure the temperature of exhaust gas, and temperature data measured by the sensor 162 may be provided to the control unit 160.

In the embodiment, the sensor 162 may be disposed on the front side of the nitrogen oxide decreasing device 130. However, in other embodiments, the sensor 162 may be disposed in a different position or another sensor 162 may be disposed in a different position. That is, the installation positions and number of sensors 162 are not limited.

For example, sensors 162 may be disposed on predetermined sides of the bypass 140 and the main discharge passage 110 so that the control unit 160 can precisely control the variable exhaust regulator 150 based on temperature data from the sensors 162.

In the embodiment of the invention, the variable exhaust regulator 150 may further include a spraying part 154 between an end of the blocking part 152 and the bypass 140. The spraying part 154 may be used to adjust the spraying direction of high temperature exhaust gas coming from the bypass 140. For this, the spraying part 154 may include at least one discharge hole 155.

In the embodiment of the invention, for example, a plurality of discharge holes 155 may be formed. High temperature exhaust gas flowing in the bypass 140 may uniformly be sprayed through the discharge holes 155 formed in the spraying part 154 of the variable exhaust regulator 150. At this time, high temperature exhaust gas may be sprayed over the entire cross-sectional area of the main discharge passage 110 and supplied to the nitrogen oxide decreasing device 130, or high temperature exhaust gas sprayed into the main discharge passage 110 may be uniformly mixed with less hot exhaust gas flowing in the main discharge passage 110 and supplied to the nitrogen oxide decreasing device 130.

Referring to FIG. 3, high temperature exhaust gas generated by the combustion equipment 10 may be cooled to a certain temperature while passing through the heat exchanger 120 of the exhaust gas treatment apparatus 100, and then the exhaust gas may flow through the main discharge passage 110.

At this time, if a temperature value of exhaust gas measured by the sensor 162 disposed at the main discharge passage 110 is within the active temperature range of the denitrification catalyst 134 of the nitrogen oxide decreasing device 130, the control unit 160 may signal the variable exhaust regulator 150 to completely close the bypass 140 so that exhaust gas flowing in the main discharge passage 110 can only be supplied to the nitrogen oxide decreasing device 130 as shown in FIG. 3(a).

On the contrary, if a temperature value of exhaust gas measured by the sensor 162 disposed at the main discharge passage 110 is outside of the active temperature range of the denitrification catalyst 134 of the nitrogen oxide decreasing device 130, the control unit 160 may signal the variable exhaust regulator 150 to open the bypass 140 so that high temperature exhaust gas can be directly supplied to the main discharge passage 110 without passing through the heat exchanger 120. At this time, the high temperature exhaust gas may be uniformly mixed with relatively low temperature exhaust gas flowing in the main discharge passage 110 as shown in FIG. 3(b) or may be exclusively sprayed on the interior of the main discharge passage 110 as shown in FIG. 3(c). In this way, the high temperature exhaust may be supplied to the nitrogen oxide decreasing device 130 alone or together with the relatively low temperature exhaust gas.

In other embodiments, the control unit 160 may control the degree of opening of the variable exhaust regulator 150 based on a temperature value of high temperature exhaust gas measured by the sensor 162 disposed at the bypass 140 and a temperature value of exhaust gas flowing in the main discharge passage 110.

For example, if the temperature of exhaust gas supplied to the nitrogen oxide decreasing device 130 is lower than about 300° C., the temperature of exhaust gas in the nitrogen oxide decreasing device 130 may be increased using the variable exhaust regulator 150 for maintaining the active temperature of the denitrification catalyst 134 and preventing a poisoning phenomenon.

That is, the control unit 160 may signal the driving unit 156 to move the blocking part 152 away from the bypass 140 to increase the degree of opening of the bypass 140. At this time, as the degree of opening of the bypass 140 is being increased, a larger area of the main discharge passage 110 may be blocked by the blocking part 152.

In the exhaust gas treatment apparatus 100 of the embodiment, as the amount of high temperature exhaust gas flowing in the bypass 140 is increased as described above, the amount of relatively low temperature exhaust gas flowing in the main discharge passage 110 is decreased. Thus, the temperature of exhaust gas in the nitrogen oxide decreasing device 130 can be increased.

On the contrary, if the temperature of exhaust gas supplied to the nitrogen oxide decreasing device 130 is greater than about 420° C., the temperature of exhaust gas in the nitrogen oxide decreasing device 130 may be decreased using the variable exhaust regulator 150 for maintaining thermal efficiency.

For this, the control unit 160 may signal the driving unit 156 to move the blocking part 152 toward the bypass 140 to decrease the degree of opening of the bypass 140. At this time, as the blocking part 152 moves toward the bypass 140 to decrease the degree of opening of the bypass 140, the degree of opening of the main discharge passage 110 may be increased.

In the exhaust gas treatment apparatus 100 of the embodiment, as the amount of high temperature exhaust gas flowing in the bypass 140 is decreased as described above, the amount of relatively low temperature exhaust gas flowing in the main discharge passage 110 is increased. Thus, the temperature of exhaust gas in the nitrogen oxide decreasing device 130 can be decreased.

In the embodiment of the invention, if exhaust gas including large amounts of sulfur oxides or having a temperature lower than the active temperature of the denitrification catalyst 134 is supplied to the nitrogen oxide decreasing device 130, the activity and selectivity of the denitrification catalyst 134 may be markedly reduced because of ammonium sulfate. That is, a poisoning phenomenon may occur.

In the exhaust gas treatment apparatus 100 of the embodiment, even in the case that the denitrification catalyst 134 is poisoned, the denitrification catalyst 134 can be regenerated by controlling the variable exhaust regulator 150 using the control unit 160.

For example, if the combustion equipment 10 uses a fuel containing about 4% of sulfur (S) such as bunker C oil, exhaust gas may contain large amounts of sulfur oxides, and while the exhaust gas passes through the nitrogen oxide decreasing device 130, ammonium sulfate may be formed on the denitrification catalyst 134 due to the sulfur oxides (a poisoning phenomenon).

In this case, the control unit 160 may control the variable exhaust regulator 150 so that the temperature of exhaust gas in the nitrogen oxide decreasing device 130 can be equal to or higher than at least about 350° C. for about five hours. Then, ammonium sulfate may be removed from the denitrification catalyst 134 as a result of reactions expressed by Chemical Formulas 5 and 6 below.

ChemistryFigure 5

$$NH_4HSO_4 \rightarrow 4NH_3 + SO_3 + H_2O \qquad [\text{Chem.}5]$$

ChemistryFigure 6

$$(NH_4)_2SO_4 \rightarrow 2NH_3 + SO_3 + H_2O \qquad [\text{Chem.}6]$$

In the above, it is explained that if a poisoning phenomenon occurs, the temperature of exhaust gas in the nitrogen oxide decreasing device 130 is maintained at about 350° C. or greater for about five hours by the control unit 160. However, operation of the exhaust gas treatment apparatus 100 for dealing with a poisoning phenomenon is not limited thereto. that is, operations of the exhaust gas treatment apparatus 100 may be varied according to the degree or period of poisoning of the denitrification catalyst 134.

For example, if the period of poisoning of the denitrification catalyst 134 is not so long, the denitrification catalyst 134 may be regenerated after the temperature of exhaust gas in the nitrogen oxide decreasing device 130 is maintained at about 350° C. or greater for about one hour. In addition, the time period necessary for regenerating the denitrification catalyst 134 may be varied according to the temperature of exhaust gas supplied to the denitrification catalyst 134.

If the denitrification catalyst 134 is seriously poisoned or left for a long period of time after being poisoned, it may take more time to regenerate the denitrification catalyst 134.

The temperature of exhaust gas at the denitrification catalyst 134 may be maintained within the range of 350° C. to 420° C. for a continuous period of time or discontinuous periods of time so as to completely regenerate the denitrification catalyst 134.

As described above, in the exhaust gas treatment apparatus 100 of the embodiment, if the denitrification catalyst 134 of the nitrogen oxide decreasing device 130 is poisoned, the poisoned denitrification catalyst 134 may be regenerated by supplying high temperature exhaust gas generated by the combustion equipment 10 to the nitrogen oxide decreasing device 130 through a route bypassing the heat exchanger 120, that is, through the bypass 140 and the main discharge passage 110.

FIG. 4 is a perspective view illustrating exemplary connection structures of the variable exhaust regulator 150 of the exhaust gas treatment apparatus 100 according to embodiments of the invention.

In the embodiments of the invention, the variable exhaust regulator 150 may be shaped like a quarter of a cylinder. The variable exhaust regulator 150 may include a pivot such as a shaft 150a disposed on the longitudinal centerline of the quarter cylinder so that the variable exhaust regulator 150 can be rotated on the shaft 150a.

The variable exhaust regulator 150 may have closed two lateral sides 151 and two flat sides extending from the centerline to a cylindrical surface. One of the two flat sides close to the main discharge passage 110 may be closed to form the blocking part 152. The other of the two flat sides may be opened so that exhaust gas coming from the bypass 140 can pass therethrough.

The cylindrical surface of the variable exhaust regulator 150 may form the spraying part 154 having the discharge holes 155.

The driving unit 156 may be connected to a side of the blocking part 152. The driving unit 156 may include an actuator extendable according to control of the control unit 160.

For example, the driving unit 156 may include a cylinder 157 and an operation rod 158. The operation rod 158 may be extendable according to a hydraulic pressure applied to the cylinder 157. The cylinder 157 may be connected to the bracket 159 provided at a side of the bypass 140, and an end of the operation rod 158 may be rotatably connected to a side of the blocking part 152 through a connection member such as a hinge.

As shown in FIG. 4(a), the operation rod 158 of the driving unit 156 may be connected to a center portion of the blocking part 152, and a slot 154a may be formed in the spraying part 154 by cutting a portion of the spraying part 154 so as to prevent interference between the operation rod 158 and the spraying part 154 when the variable exhaust regulator 150 rotates.

In the embodiment shown in FIG. 4(b), driving units 156' include cylinders 157' and operation rods 158' extendable from the cylinders 157'. The operation rods 158' of the driving units 156' may be coupled to one or both sides of the blocking part 152. For example, the operation rods 158' may rotatably be coupled to both sides of the spraying part 154 using pins 150b.

FIG. 5 is a graph for explaining an exemplary method of operating the exhaust gas treatment apparatus 100 according to an embodiment of the invention.

Referring to FIG. 5, the temperature of exhaust gas supplied to the nitrogen oxide decreasing device 130 may periodically be increased under control of the control unit 160.

The amount of temperature increase ($\Delta T$) and the period of holding time ($\Delta t$) at the increased temperature may be varied according to the composition and temperature of exhaust gas. For example, if exhaust gas contains large amounts of sulfur oxides (SOx), catalyst poisoning may occur frequently and seriously, and thus the amount of temperature increase ($\Delta T$) and the period of holding time ($\Delta t$) may be increased.

If ammonia is supplied to the nitrogen oxide decreasing device 130 (an SCR device) during a catalyst regeneration operation, the denitrification catalyst 134 of the nitrogen oxide decreasing device 130 may inefficiently be regenerated. In general, if the required efficiency of denitrification is 80%, the ratio of $NH_3$/NOx is maintained within the range of 0.80 to 0.83. However, since ammonium sulfate decomposes to generate $NH_3$ during catalyst regeneration, it may be necessary to reduce the ratio of $NH_3$/NOx to a level lower than the range of 0.80 to 0.83, so as to decrease the temperature of catalyst regeneration and increase the efficiency of catalyst regeneration.

However, if the amount of ammonia supply is reduced, the efficiency of the denitrification catalyst 134 may be lowered, and thus the concentrations of nitrogen oxides (NOx) may increase at the downstream side of the denitrification catalyst 134 to levels higher than those regulated by environmental regulations. Therefore, during a catalyst regeneration operation, the combustion load of the combustion equipment 10 may be reduced to decrease the emission of exhaust gas. If the combustion load of the combustion equipment 10 is reduced, the temperature of exhaust gas generated by the combustion equipment 10 may also be reduced, and thus the temperature of exhaust gas in the nitrogen oxide decreasing device 130 may appropriately be adjusted using the variable exhaust regulator 150.

Mode for the Invention

Figure 6:
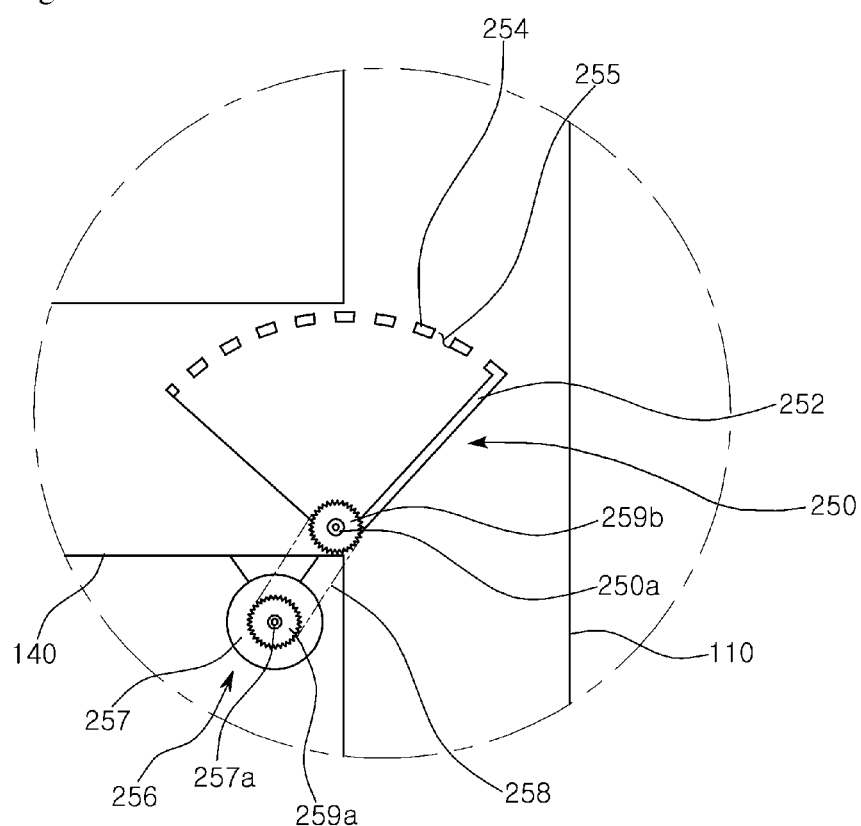
FIG. 6 is a schematic cross-sectional view illustrating a variable exhaust regulator of the exhaust gas treatment apparatus according to another embodiment of the invention.

FIG. 6 is a schematic cross-sectional view illustrating a variable exhaust regulator 250 of the exhaust gas treatment apparatus 100 according to another embodiment of the invention.

Referring to FIG. 6, the variable exhaust regulator 250 of the embodiment may include: a blocking part 252 configured to open/close the main discharge passage 110 or the bypass 140; and a spraying part 154 having at least one discharge hole 255 for uniformly spraying high temperature exhaust gas.

The variable exhaust regulator 250 may further include a driving unit 256 to swing the blocking part 252 for adjusting the degree of opening/closing of the bypass 140 or the main discharge passage 110.

A motor 257 may be connected to a shaft 250a of the blocking part 252 to rotate the blocking part 252.

The motor 257 may directly be connected to the shaft 250a of the blocking part 252. Alternatively, the motor 257 may be disposed outside the bypass 140, and a shaft 257a of the motor 257 may be connected to the shaft 250a of the blocking part 252 through a rotation connection member such as a chain 258 or a belt. For this, sprockets 259 and 259b may be disposed on the shaft 250a of the blocking part 252 and the shaft 257a of the motor 257, respectively.

In the embodiment, the variable exhaust regulator 250 includes the blocking part 252 to open/close the bypass 140 or the main discharge passage 110, and the blocking part 252 can be rotated to adjust the amounts of opening of the bypass 140 and the main discharge passage 110. However, the configuration of the variable exhaust regulator 250 is not limited thereto. That is, the configuration of the variable exhaust regulator 250 can be variously modified.

Figure 7:
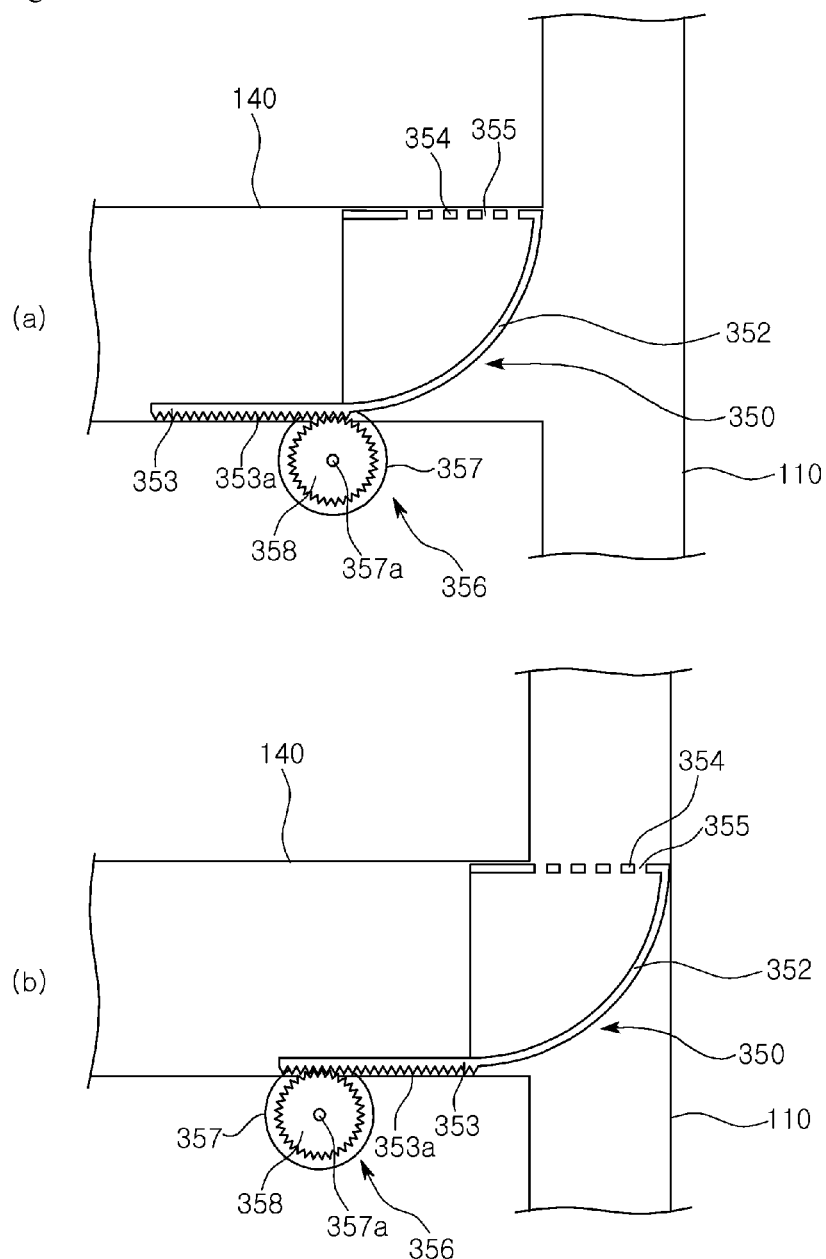
FIG. 7 is a schematic cross-sectional view illustrating a variable exhaust regulator of the exhaust gas treatment apparatus according to another embodiment of the invention.

FIG. 7 is a schematic cross-sectional view illustrating a variable exhaust regulator 350 of the exhaust gas treatment apparatus 100 according to another embodiment of the invention.

Referring to FIG. 7, the variable exhaust regulator 350 of the embodiment may include: a blocking part 352; and a driving unit 356 configured to move the blocking part 352 to adjust the degree of opening/closing of the bypass 140 or the main discharge passage 110.

The blocking part 352 may include a lower extension 353 extending toward the bypass 140, and a rack gear 353a may be formed on a side of the extension 353.

A pinion gear 358 connected to a shaft 357a of a motor 357 may be engaged with the rack gear 353a.

If the motor 357 of the variable exhaust regulator 350 is operated, the pinion gear 358 is rotated, and thus the rack gear 353a is moved to shift the blocking part 352 into the bypass 140 or the main discharge passage 110. In this way, the amounts of opening/closing of the bypass 140 and the main discharge passage 110 can be adjusted.

In addition, a spraying part 354 may extend from an upper side of the blocking part 352 toward the bypass 140.

At least one discharge hole 355 may be formed in the spraying part 354, and thus high temperature exhaust flowing in the bypass 140 may be sprayed on the interior of the main discharge passage 110 through the discharge hole 355. At this time, high temperature exhaust gas may be sprayed on the entire cross-sectional area of the main discharge passage 110 and supplied to the nitrogen oxide decreasing device 130, or high temperature exhaust gas sprayed on the interior of the main discharge passage 110 may uniformly be mixed with less hot exhaust gas flowing in the main discharge passage 110 and supplied to the nitrogen oxide decreasing device 130.

In the embodiment, the blocking part 352 has a curved shape to minimize flow resistance. However, the shape of the blocking part 352 is not limited thereto. That is, the shape of the blocking part 352 may be variously varied. For example, the blocking part 352 may be shaped so that the bypass 140 and the main discharge passage 110 can be blocked by a vertical surface, or the blocking part 352 may have a sloped shape.

In each of the above-described embodiments, the exhaust gas treatment apparatus 100 includes a single variable exhaust regulator 150, 250, or 350. However, the number, configurations, and operations of variable exhaust regulators are not limited thereto.

Figure 8:
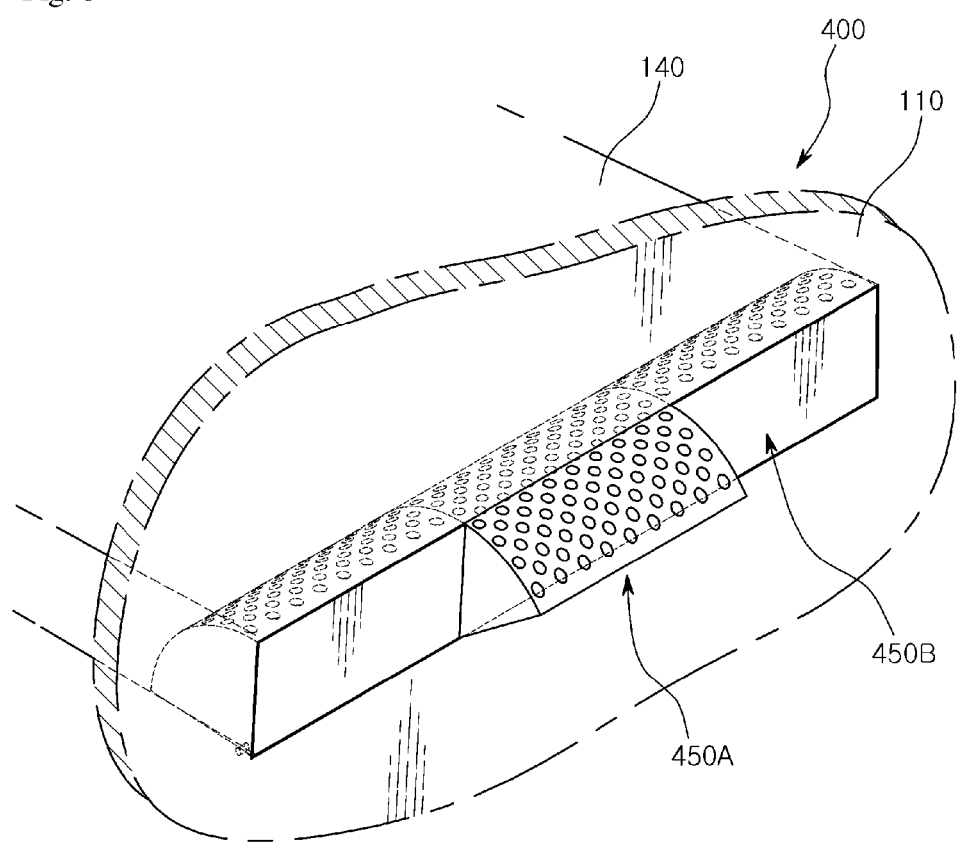
FIG. 8 is a view illustrating an interior portion of an exhaust gas treatment apparatus according to another embodiment of the invention.
Figure 9:
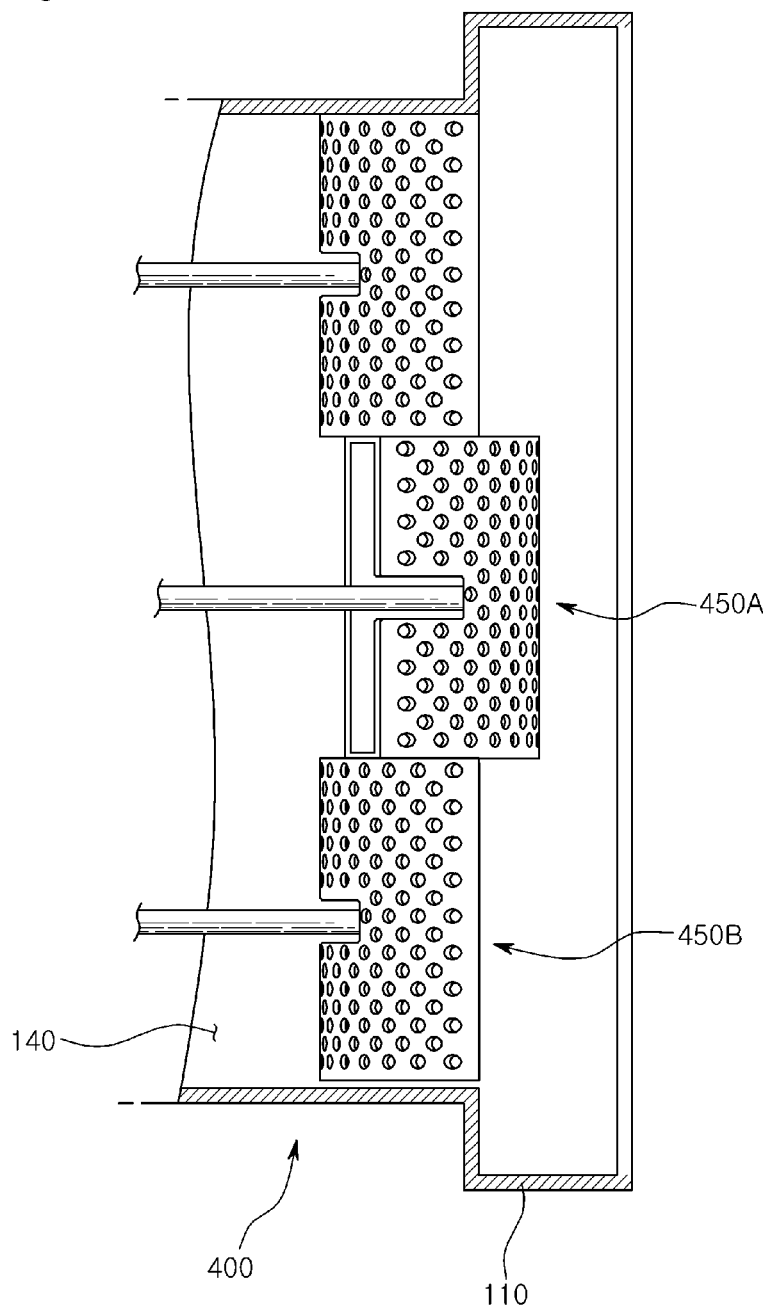
FIG. 9 is a plan view illustrating variable exhaust regulators of the exhaust gas treatment apparatus according to the other embodiment of the invention.
Figure 10:
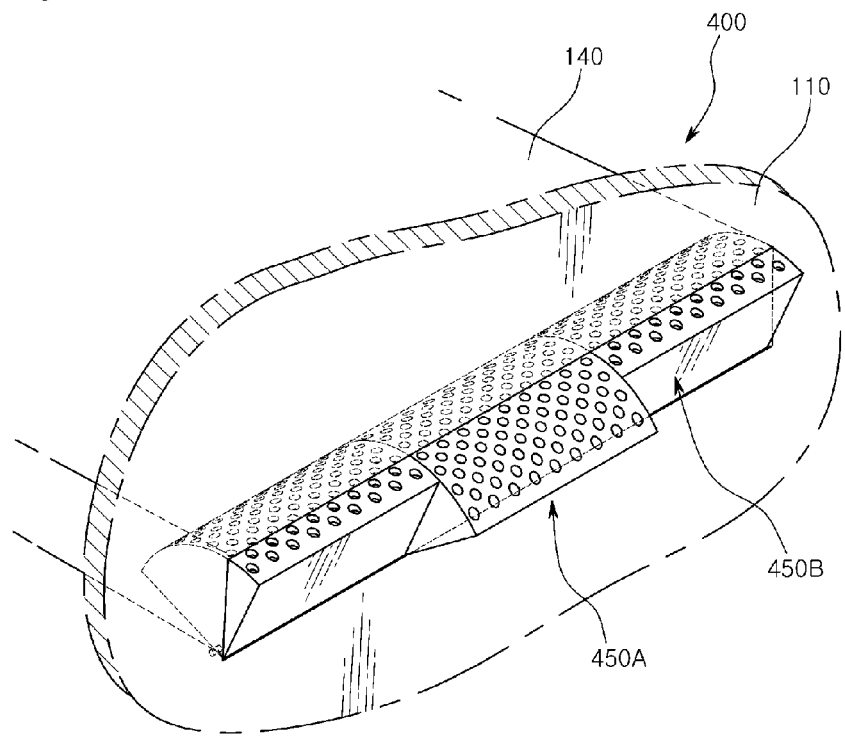
FIG. 10 is a perspective view illustrating the variable exhaust regulators of the exhaust gas treatment apparatus according to the other embodiment of the invention.
Figure 11:
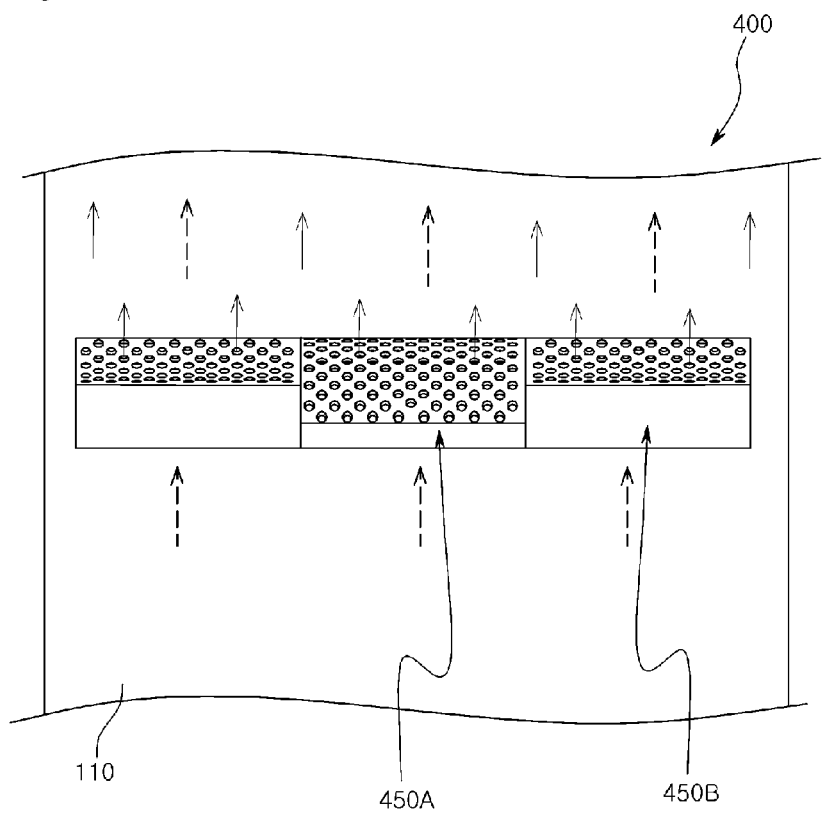
FIG. 11 is a front view illustrating the variable exhaust regulators of the exhaust gas treatment apparatus according to the other embodiment of the invention.
Figure 12:
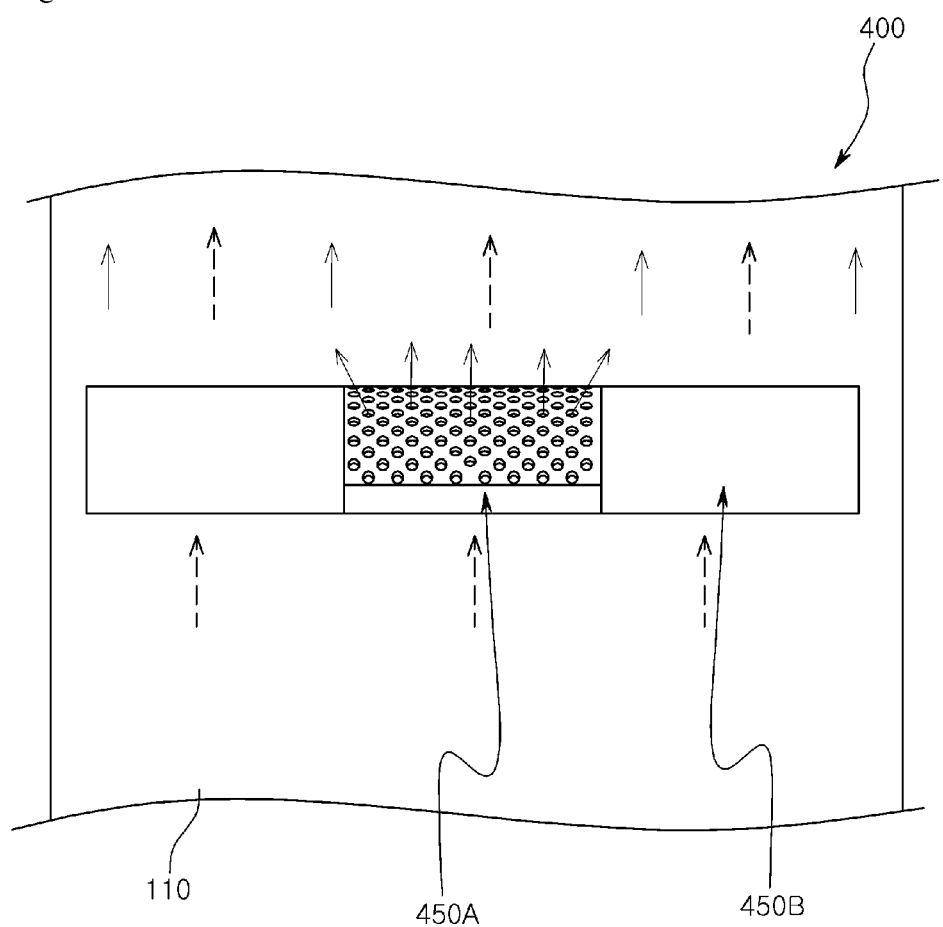
FIG. 12 is a front view illustrating the variable exhaust regulators of the exhaust gas treatment apparatus according to the other embodiment of the invention.

FIG. 8 is a view illustrating an interior portion of an exhaust gas treatment apparatus 400 according to another embodiment of the invention; FIG. 9 is a plan view illustrating variable exhaust regulators 450A and 450B of the exhaust gas treatment apparatus 400 according to the other embodiment of the invention; and FIG. 10 is a perspective view illustrating the variable exhaust regulators 450A and 450B of the exhaust gas treatment apparatus 400 according to the other embodiment of the invention. FIG. 11 is a front view illustrating an opened state of the variable exhaust regulators 450A and 450B of the exhaust gas treatment apparatus 400 according to the other embodiment of the invention, and FIG. 12 is a front view illustrating the variable exhaust regulators 450A and 45B of the exhaust gas treatment apparatus 400 according to the other embodiment of the invention.

Referring to FIGS. 8 to 12, the exhaust gas treatment apparatus 400 of the other embodiment may include a plurality of variable exhaust regulators 450A and 450B.

The variable exhaust regulators 450A and 450B may open/close a bypass 140 or a main discharge passage 110 using actuators so as to appropriately mix relatively high temperature exhaust gas discharged through the bypass 140 with relatively low temperature exhaust gas discharged through the main discharge passage 110.

In the exhaust gas treatment apparatus 400 of the current embodiment, if it is necessary to increase the temperature of exhaust gas in a nitrogen oxide decreasing device 130, one of the variable exhaust regulators 450A and 450B of the exhaust gas treatment apparatus 400 may be opened. For example, the exhaust gas treatment apparatus 400 may include three variable exhaust regulators 450A and 450B, and the middle variable exhaust regulator 450A may first be opened.

After the middle variable exhaust regulator 450A is opened, high temperature exhaust gas flowing in the bypass 140 may be sprayed on the interior of the main discharge passage 110 through discharge holes of a spraying part and uniformly mixed with relatively low temperature exhaust gas flowing in the main discharge passage 110.

At this time, the relatively low temperature exhaust gas may flow forward through a gap between the opened middle variable exhaust regulator 450A and the main discharge passage 110 and both sides of the opened middle variable exhaust regulator 450A (that is, front sides of the other variable exhaust regulators 450A and 450B). Thereafter, the relatively low temperature exhaust gas may be mixed with the high temperature exhaust gas sprayed from the bypass 140.

If the temperature of exhaust gas in the nitrogen oxide decreasing device 130 is lower than the active temperature of the denitrification catalyst 134, the middle variable exhaust regulator 450A may further be opened, and at the same time, the other variable exhaust regulators 450A and 450B disposed at both sides of the middle variable exhaust regulator 450A may be opened, so as to increase the flow rate of exhaust gas flowing in the bypass 140.

In the exhaust gas treatment apparatus 400, a control unit 160 may control the amounts of opening/closing of the variable exhaust regulators 450A and 450B based on a temperature of exhaust gas measured by a sensor 162 disposed at a front side of the nitrogen oxide decreasing device 130.

A plurality of sensors 162 may be disposed at the front side of the nitrogen oxide decreasing device 130, and the degrees of opening of the variable exhaust regulators 450A and 450B may individually controlled based on temperatures of exhaust gas measured by the sensors 162.

While the present invention has been shown and described in connection with the embodiments, it will be apparent to those skilled in the art that modifications and variations can be made without departing from the spirit and scope of the invention as defined by the appended claims.

This application claims the priority of Korean Patent Application No. 10-2012-0092887 filed on 2012 Aug. 24, in the Korean Intellectual Property Office, the disclosure of which is incorporated herein by reference.

SEQUENCE LISTING FREE TEXT

10: combustion equipment 100: exhaust gas treatment apparatus
110: main discharge passage 112: reducing agent sprayer
120: heat exchanger 130: nitrogen oxide decreasing device
132: chamber 134: denitrification catalyst
136: soot blower 140: bypass
150: variable exhaust regulator 152: blocking part
154: spraying part 155: discharge hole
156: driving unit 157: cylinder
158: operation rod 159: bracket
160: control unit 162: sensor

The invention claimed is:
1. An exhaust gas treatment apparatus comprising:
a main discharge passage through which exhaust gas generated by combustion equipment is discharged;
a heat exchanger disposed between the combustion equipment and the main discharge passage;
a nitrogen oxide decreasing device connected to the main discharge passage so as to decrease nitrogen oxides included in exhaust gas;
a bypass connected from the combustion equipment to the main discharge passage as a passage bypassing the heat exchanger so as to supply high temperature exhaust gas generated by the combustion equipment to the nitrogen oxide decreasing device through a passage bypassing the heat exchanger; and
a variable exhaust regulator disposed between the bypass and the main discharge passage so as to vary discharge of relatively high temperature exhaust gas flowing through the bypass and discharge of relatively low temperature exhaust gas flowing through the main discharge passage in a correlated manner, wherein the variable exhaust regulator is insertable into the bypass and comprises:

a blocking part used to adjust a degree of opening or closing of the bypass or the main discharge passage;

a driving unit configured to swing or move the blocking part;

a control unit configured to control the driving unit so as to adjust a degree of opening or closing of the blocking part according to a temperature of exhaust gas flowing in the main discharge passage and a temperature of exhaust gas flowing in the bypass; and a spraying part between an end of the blocking part and the bypass, and at least one discharge hole is formed in the spraying part to adjust a spraying direction of high temperature exhaust gas.

2. The exhaust gas treatment apparatus of claim 1, wherein the blocking part is rotatable at an end thereof, and the driving unit comprises an actuator connected to a side of the blocking part and extendable to push or rotate the blocking part.

3. The exhaust gas treatment apparatus of claim 1, wherein the blocking part is rotatable at an end thereof, and the driving unit comprises a motor configured to rotate the blocking part through at least a connection member.

4. The exhaust gas treatment apparatus of claim 1, further comprising one or more additional variable exhaust regulators, wherein the variable exhaust regulators are individually operated and correlated so as to control discharging of exhaust gas flowing through the bypass and the main discharge passage.

5. The exhaust gas treatment apparatus of claim 1, wherein the nitrogen oxide decreasing device comprises a selective catalyst reduction device configured to remove nitrogen oxides from exhaust gas by bringing the exhaust gas into contact with a catalyst.

6. The exhaust gas treatment apparatus of claim 5, wherein a temperature of exhaust gas in the selective catalyst reduction device is maintained within a range of 300° C. to 420° C. by the control unit of the variable exhaust regulator.

7. The exhaust gas treatment apparatus of claim 5, wherein if a poisoning phenomenon occurs in the selective catalyst reduction device, temperature of exhaust gas in the selective catalyst reduction device is maintained within a range of 350° C. to 420° C. by the control unit of the variable exhaust regulator.

* * * * *